United States Patent [19]

Elzinga, Jr.

[11] 4,412,528
[45] Nov. 1, 1983

[54] HEAT STORAGE WINDOW

[75] Inventor: Eugene R. Elzinga, Jr., Warren, N.J.

[73] Assignee: Exxon Research and Engineering Co., Florham Park, N.J.

[21] Appl. No.: 383,721

[22] Filed: Jun. 1, 1982

Related U.S. Application Data

[63] Continuation of Ser. No. 139,290, Apr. 11, 1980, abandoned.

[51] Int. Cl.³ .................................................. F24J 3/02
[52] U.S. Cl. .................................. 126/417; 126/400; 126/901; 126/435
[58] Field of Search ................ 126/400, 901, 417, 429, 126/439, 435; 252/67, 70, 71; 165/49, 53; 136/247; 350/96.1

[56] References Cited

U.S. PATENT DOCUMENTS 3,174,537  3/1965  Meyer ........................... 126/901 X
4,282,858  8/1981  Bowers, Jr. ..................... 126/439 X

OTHER PUBLICATIONS

"Luminescent Solar Concentrates", *Applied Optics*, pp. 3090-3110, vol. 18, No. 18, Sep. 15, 1979.
"Luminescent Greenhouse Collector for Solar Radiation", *Applied Optics*, pp. 2299-2300, vol. 15, No. 10, Oct. 1976.

*Primary Examiner*—Samuel Scott
*Assistant Examiner*—Randall L. Green
*Attorney, Agent, or Firm*—Joseph J. Dvorak

[57] ABSTRACT

The present invention comprises a planar window panel, which is in optical contact with heat storage means. The panel includes a fluorescent material for trapping at least a portion of the incident solar radiation and directing it to the heat storage means, whereby a portion of the light is stored in such heat storage means for subsequent use. In a particularly preferred embodiment of the present invention, the heat storage means consists essentially of a phase change material which has a transition temperature generally in the range of 50° F. to 150° F., and preferably in the range of 70° F. to 110° F. In order to utilize the heat stored in the heat storage window at times when the incident solar radiation is relatively low, means are provided to pass a heat exchange fluid in contact with the heat storage means.

5 Claims, 5 Drawing Figures

HEAT STORAGE WINDOW

This is a continuation of application Ser. No. 139,290 filed Apr. 11, 1980 now abandoned.

FIELD OF THE INVENTION

This invention relates generally to the storage and retention of radiant energy and, particularly, to a window useful in the storage of solar radiant energy.

BACKGROUND OF THE INVENTION

Increasing fuel costs have led to the investigation of numerous techniques for efficient utilization of solar radiant energy. There is increased interest, for example, in designing south-facing walls of homes and other buildings with large expenses of glass to capture the incident solar radiation for warming the interior of the building in the winter, and with appropriately placed overhangs to shield those windows from impingement of solar radiation during the summer. If standard glazing is used in such designs, however, it is no unusual to experience excessively high temperatures within the room on bright winter days. Thus, the solar radiant energy is not used to maximum advantage or with maximum efficiency.

SUMMARY OF THE INVENTION

Broadly stated, the present invention comprises a planar window panel, which is in optical contact with heat storage means. The panel includes a fluorescent material for trapping at least a portion of the incident solar radiation and directing it to the heat storage means, whereby a portion of the light is stored in such heat storage means for subsequent use. In a particularly preferred embodiment of the present invention, the heat storage means consists essentially of a phase change material which has a transition temperature generally in the range of 50° F. to 150° F., and preferably in the range of 70° F. to 110° F. In order to utilize the heat stored in the heat storage window at times when the incident solar radiation is relatively low, means are provided to pass a heat exchange fluid in contact with the heat storage means.

These and other embodiments of the instant invention will become more apparent upon reading of the detailed description of the invention in conjunction with the drawings.

DETAILED DESCRIPTION OF THE INVENTION

Figure 1:
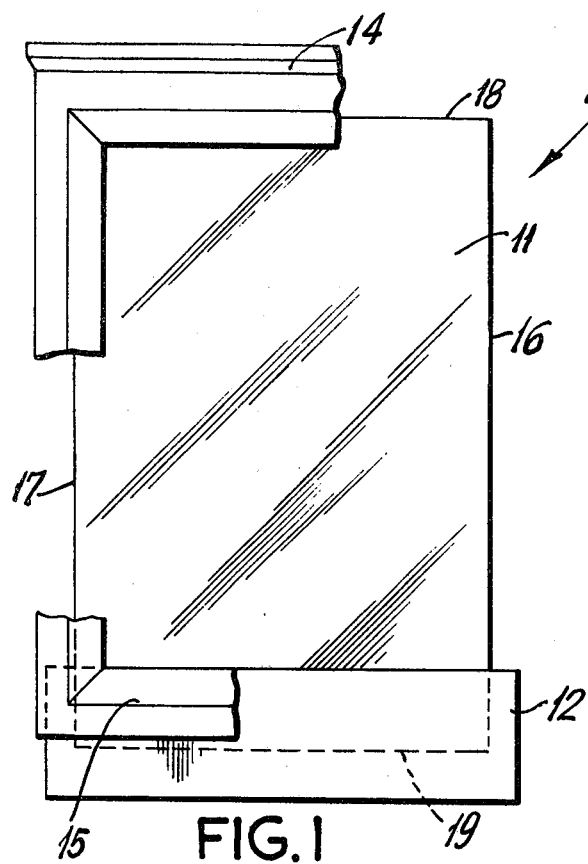
FIG. 1 is a front elevation of a heat storage window, partly in section, in accordance with the present invention.

Reference is now made to FIG. 1 which illustrates a heat storage window shown generally as 10, wherein a planar window panel 11 is in optical contact with heat storage means 12. In the embodiment shown in FIG. 1, the window is inserted in a wall (not shown) by means of an appropriate window frame 14, including a windowsill portion 15. The planar window panel 11 has side edges 16, 17 and 18 and a bottom edge 19.

Figure 3:
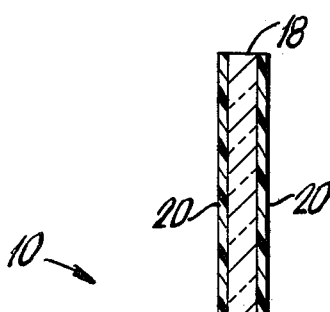
FIG. 3 is a side elevation of yet another type of heat storage window.

The top edge 18 and side edges 16 and 17 of planar window panel 11 are provided with a mirrored or otherwise reflective surface. Additionally, the planar panel 11 consists, for examwple, of glass, including fluorescent materials such as fluorescent chelates and inorganic ions such as $Nd^{+3}$ or $Eu^{+3}$. Optionally, organic layers of fluorescent dyes, such as layers 20, may be applied to the major surfaces from the back of the planar panel 11, such as shown, for example, in FIG. 3.

Figure 2:
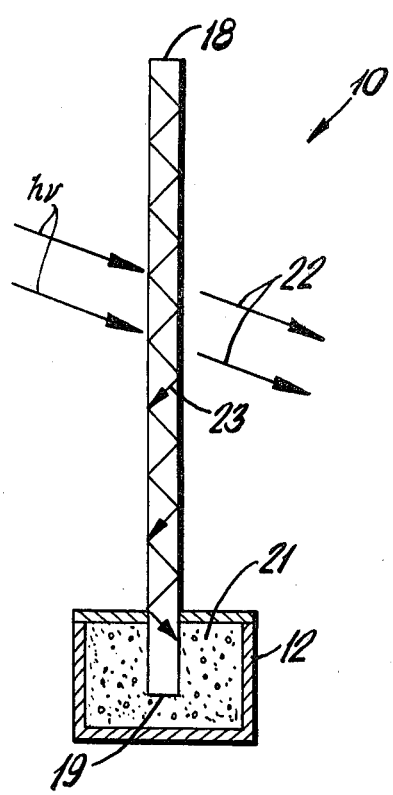
FIG. 2 is a side elevation of the heat storage window of the present invention.

As is shown in FIG. 2, radiant energy, $h\nu$, direct from the sun on a clear day, or diffuse radiant energy as encountered on overcast days, which is incident upon the surface of the window panel 11, will be partially absorbed by the fluorescent material which then re-emits radiation at a longer wavelength in random directions. Some of this redirected radiation will be trapped by the phenomenon of total internal reflection and transmitted to the edges of the planar panel. Some of the radiation, of course, will pass through the panel and into the room (lines 22). Additionally, some of the radiation proceeding to the edges of the panel will then be reflected by virtue of the mirrored surfaces on the edges. Ultimately, some light, 23, will be transmitted to the bottom edge 19 of the planar panel 11 for ultimate storage in radiant energy storage means 12.

As can be seen in the figures, the energy storage means 12 consists essentially of a large container containing heat storage material 21. The heat storage material 21, of course, may be high heat capacity material, such as metal spheres and the like. Preferably, the heat storage material is a phase change material, i.e., a material which will undergo a change in phase in the temperature range of interest. Thus, the preferred heat storage material is one which has a transition temperature generally in the range of about 50° F. to about 150° F., and preferably in the range from about 70° F. to about 110° F. Typical phase change materials include paraffin waxes and hydrates of sodium sulfate and the like.

Figure 4:
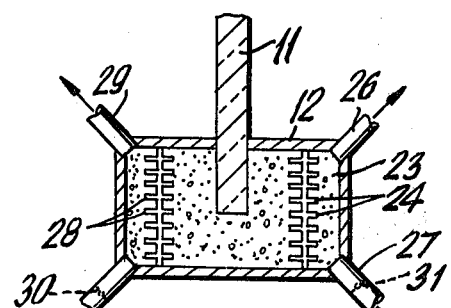
FIG. 4 is a schematic illustration of one technique for removing heat stored in the heat storage window of the present invention.

During daylight hours, some of the radiation, $h\nu$, incident on the planar window will be transmitted through the window into the interior of the room. The fluorescent material of the planar window panel 11, however, will capture some of the radiation and the emitted light will be directed downwardly (line 23) toward the heat storage means 12 where the radiation will give up its energy to the phase change material 21 in the heat storage means 12. In absorbing the radiation concentrated and directed into the heat storage means 12, the phase change material 21, of course, will ultimately change phase when the temperature reaches the phase transition temperature. During periods of darkness, the phase change material will revert to its unheated phase giving up the stored energy to its surroundings. This exchange of heat can be facilitated by providing an appropriate heat exchange mechanism in thermal contact with the phase change material 21 located within the heat exchanger means 12. In the embodiment as shown in FIG. 4, for example, there are a plurality of fins 24 which are in contact with the phase change material and which extend into a plenum chamber 23 on the interior side of the window. As the air within the plenum chamber 23 becomes warm, it rises into the interior of the room via outlet 26. Cooler air, by thermal syphoning, will enter the plenum chamber via inlet 27. Thus, in effect, this thermal syphoning action serves to circulate air throughout the room, taking the heat that is stored in the heat storage means 12 and distributing it during nighttime hours.

Optionally and preferably, as shown in FIG. 4, an additional set of fins 28 are provided on the exterior side of the window assembly 10. These fins are also in heat exchange relationship with the phase change material within the heat storage chamber 12 and extend into a plenum chamber 28. Valve means 30 and 31 are also provided to close one or both of the inlets to the heat exchange plenum. During winter months, valve 30 can be closed and valve 31 left open so that the heat stored in the heat chamber 12 will be used to heat air circulating through plenum chamber 23 and into the interior of the building. During summer months, valve 31 can be closed and valve 30 opened, thereby providing a mechanism for rejecting the heat stored in the heat storage chamber 12 to the outside atmosphere again by thermal syphoning, thereby helping to maintain lower temperatures within the interior. Of course, in this mode, the phase transition temperature must be below the desired interior temperature, e.g., 80° F.

Figure 5:
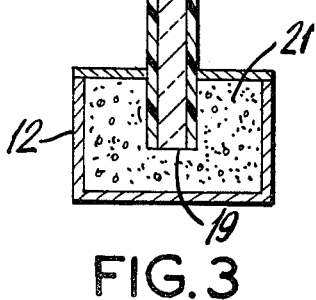
FIG. 5 is a front elevation of the section showing yet another technique for removing heat from the heat storage window of the present invention.

In the embodiment shown in FIG. 5, a fluid can be pumped through the heat storage medium 12 via a conduit 32. Conduit 32, of course, has an inlet portion 33 and an outlet portion 34 and the so-heated fluid can pass via conduit 34 to a point of use. In this manner fresh outside air could be warmed before entering the interior.

From the foregoing, it should be readily apparent that among many of the advantages of the heat storage window of the present invention are the following:

(1) The window reduces glare, thereby making it more pleasant and comfortable to see through the window.

(2) The window avoids overheating of the interior of the building on bright, sunny days, yet takes advantage of the sunlight on those days by storing that energy for subsequent use.

(3) The window provides a means for reducing the amount of radiation that passes into the interior of the building during the summer months, thereby also providing for increased interior comfort and, in instances where the interior is air conditioned, it reduces energy costs in conditioning the space within the interior of the building because of the reduced energy transmission into the interior of the building.

Clearly, other applications for the invention described herein will be apparent to those skilled in the art. Various modifications and other changes may be made to the present invention from the principles set forth and described without departing from the spirit and scope hereof, as encompassed in the accompanying claims.

What is claimed is:

1. A window comprising: a light transmissive planar window panel and a heat storage means, said planar window having four edges, said heat storage means disposed on one edge of said planar window panel, the remaining edges of said planar window panel having light reflective material on the surface thereof, said planar window panel including fluorescent material for absorbing a portion of solar radiation incident on said window and re-emitting the absorbed radiation at a different wavelength in random directions whereby the re-emitted radiation will be trapped by the phenomenon of total internal reflection and transmitted through the panel toward said heat storage means whereby the radiation directed toward said heat storage means is stored therein for subsequent use and whereby the solar radiation incident on said window which is not absorbed by said fluorescent material is transmitted through the panel.

2. The window of claim 1 wherein said heat storage means consists of a housing containing a phase change material which has a transition temperature in the range of from about 50° F. to about 150° F.

3. The window of claim 2 wherein heat exchange means are provided for removing heat stored in said heat storage means.

4. A window for storage of solar radiation for subsequent use comprising:

a light transmitting planar panel including fluorescent material sufficient to partially absorb solar radiation incident on said panel and re-emit said absorbed radiation at a different wavelength in random directions, said panel having a top edge, bottom edge and side edges;

light reflective material on the surface of said top edge and said side edges;

heat storage means disposed along at least a portion of said panel at said bottom edge of said panel whereby at least a portion of said solar radiation incident on said panel which is absorbed from said fluorescent material and re-emitted in random directions at different wavelengths or is internally reflected by and re-emitted through said panel to said heat storage means and stored therein as heat for subsequent use.

5. The window of claim 4 including means for removing heat from said heat storage means.

* * * * *